United States Patent [19]

Hinohara

[11] Patent Number: 5,663,629
[45] Date of Patent: Sep. 2, 1997

[54] BATTERY CHARGER WHICH DETECTS THE BATTERY CHARGING STATUS

[75] Inventor: Makoto Hinohara, Tokyo, Japan

[73] Assignee: Canon Kabushiki Kaisha, Tokyo, Japan

[21] Appl. No.: 527,454

[22] Filed: Sep. 13, 1995

[30] Foreign Application Priority Data

Sep. 16, 1994 [JP] Japan .................................. 6-221725

[51] Int. Cl.$^6$ .............................. H01M 10/44; H02J 7/00
[52] U.S. Cl. ................................ 320/31; 320/32; 320/48
[58] Field of Search ................................ 320/31, 32, 33, 320/39, 40, 48

[56] References Cited

U.S. PATENT DOCUMENTS 5,237,259  8/1993  Sanpei .................................. 320/31 X
5,274,321 12/1993  Matsuda ................................ 320/31
5,298,850  3/1994  Matsui .................................. 320/48
5,460,901 10/1995  Syrjala ................................. 429/90

*Primary Examiner*—Peter S. Wong
*Assistant Examiner*—Patrick B. Law
*Attorney, Agent, or Firm*—Fitzpatrick, Cella, Harper & Scinto

[57] ABSTRACT

A secondary battery is charged to a full charge state without overcharging. A current detection circuit detects a charging current state supplied to the battery to control the turn-on and the turn-off of a switch in accordance with an output of the current detection circuit to control the application of the charging current to the battery.

14 Claims, 8 Drawing Sheets

BATTERY CHARGER WHICH DETECTS THE BATTERY CHARGING STATUS

BACKGROUND OF THE INVENTION

1. Field of the Invention

The present invention relates to a charger for rapidly charging a lithium ion battery.

2. Related Background Art

The following two methods have been used in the past as charging methods for a lithium ion battery.

Referring to FIGS. 10 to 13, configurations and operations of prior art chargers are explained.

FIG. 10 shows a circuit block diagram for illustrating a configuration of a prior art charger.

In FIG. 10, numeral 101 denotes a rectifier/filter circuit for rectifying and filtering AC 100 volts, numeral 102 denotes a constant voltage/constant current regulation circuit, numeral 103 denotes a switching circuit, numeral 104 denotes a timer circuit and numeral 105 denotes a lithium ion battery.

FIG. 11 shows a voltage-current characteristic of the constant voltage/constant current regulation circuit 102 shown in FIG. 10 wherein an ordinate represents a voltage V and an abscissa represents a current I.

As shown, in the constant voltage/constant current regulation circuit 102, a charging current is limited to be no greater than a predetermined current and a charging voltage is limited to be no greater than a predetermined voltage and the charging current is supplied to the battery 105 from the constant voltage/constant current regulation circuit 102, and when a predetermined time period which is preset by the timer circuit 104 has elapsed, the charging is stopped by opening the switching circuit 103 to shut off the charging current.

FIG. 12 shows a circuit block diagram for illustrating a configuration of another prior art charger. The like elements to those in FIG. 10 are designated by the like numerals.

In FIG. 12, numeral 106 denotes a voltage detection circuit for detecting a battery voltage. When it detects a predetermined battery voltage (point A in FIG. 13), it opens (turns off) the switching circuit 103 to shut off the charging current to stop the charging.

FIG. 13 shows a characteristic chart of a time shift of a charging voltage and a charging current in charging by the prior art charger, in which an ordinate represents a charge and an abscissa represents a time.

In FIG. 13, when the battery voltage approaches a full charge, it becomes constant and the charging current starts to decrease.

However, in the charger shown in FIG. 10, the predetermined time preset by the timer is needed without regard to the remaining amount of charge, which is loss of time for a user and may lead to overcharging.

Further, in the charger shown in FIG. 12, when the charging is stopped upon the detection of the voltage at the point A as shown in FIG. 13, the charged amount reaches only approximately 90% of the battery capacity. The user cannot detect the current charge amount during the charging.

SUMMARY OF THE INVENTION

The present invention intends to solve the above problems and it is a first object of the present invention to provide a charger which detects a charging current status supplied to a secondary battery to control an application status of the charging current to the secondary battery to assure full charging of the secondary battery without overcharging.

It is a second object of the present invention to provide a charger which detects a charged voltage charged to the secondary battery and controls a supply time of the subsequent charging current if the charged voltage is a predetermined potential to assure the full charging of the secondary battery without overcharging.

It is a third object of the present invention to provide a charger which detects the charged voltage charged to the secondary battery, derives a charge completion time at which the secondary battery reaches the full charge status based on the detected charged voltage and the charge characteristic information of the secondary battery and controls the supply time of the subsequent charging current based on the derived charge completion time to assure the full charging of the secondary battery without overcharging.

It is a fourth object of the present invention to provide a charger which detects the charged voltage charged to the secondary battery and displays the battery capacity for the detected charged voltage whether the charging current is supplied from the constant voltage/constant current regulation circuit or not so that the battery capacity of the secondary battery is manifested to a user.

It is a fifth object of the present invention to provide a charger which detects the charged voltage charged to the secondary battery and displays the charge amount for the detected charged voltage during the supply of the charging current from the constant voltage/constant current regulation circuit so that the charge amount of the secondary battery is manifested to the user.

It is a sixth object of the present invention to provide a charger in which charge amount monitoring means shortens the battery capacity display interval after the battery capacity of the secondary battery has exceeded a predetermined capacity so that the approach to the full charge is manifested to the user.

The first aspect of the present invention relates to a charger for supplying a charging current from a constant voltage/constant current regulation circuit to a secondary battery having a lithium based material in a positive electrode to charge the secondary battery to a predetermined potential, comprising current detection means for detecting a current across a resistor connected in series with the constant voltage/constant current circuit and the secondary battery to detect the charging current, and first control means for controlling an application status of the charging current supplied from the constant voltage/constant current regulation circuit to the secondary battery in accordance with the detection output of the current detection means.

The second aspect of the present invention relates to a charger for supplying a charging current from a constant voltage/constant current regulation circuit to a secondary battery having a lithium based material in a positive electrode to charge the secondary battery to a predetermined potential, comprising voltage detection means for detecting whether the charged voltage of the secondary battery is at the predetermined potential or not, and second control means for controlling a supply time of the charging current supplied from the constant voltage/constant current regulation circuit in accordance with the output of the voltage detection means.

The third aspect of the present invention relates to a charger for supplying a charging current from a constant voltage/constant current regulation circuit to a secondary battery having a lithium based material in a positive electrode to charge the secondary battery to a predetermined potential, comprising voltage detection means for detecting whether the charged voltage of the secondary battery is at the predetermined potential or not, derive means for deriving a charge completion time required to render the secondary battery to a full charge state in accordance with the output of the voltage detection means and charge characteristic information of the secondary battery, and third control means for controlling a supply time of the charging current supplied from the constant voltage/constant current regulation circuit based on the charging completion time derived by the derive means.

The fourth aspect of the present invention relates to a charger for supplying a charging current from a constant voltage/constant current regulation circuit to a secondary battery having lithium based material in a positive electrode to charge the battery to a predetermined potential, comprising a plurality of display means for displaying a battery capacity of the secondary battery, voltage state detection means for detecting a charged voltage state of the secondary battery, and battery capacity monitoring means for causing the display means to display the battery capacity of the secondary battery in accordance with the output of the voltage state detection means whether the charging current is supplied from the constant voltage/constant current regulation circuit or not.

The fifth aspect of the present invention relates to a charger for supplying a charging current from a constant voltage/constant current regulation circuit to a secondary battery having a lithium based material in a positive electrode to charge the battery to a predetermined potential, comprising a plurality of display means for displaying a battery capacity of the secondary battery, voltage state detection means for detecting a charged voltage state of the secondary battery, and charge amount monitoring means for causing the display means to display the battery capacity of the secondary battery in accordance with the output of the voltage state detection means at a predetermined interval during the supply of the charging current from the constant voltage/constant current regulation circuit.

The sixth aspect of the present invention relates to a charger in which the charge amount monitoring means shortens the battery capacity display interval after the battery capacity of the secondary battery has exceeded a predetermined capacity.

In the charger according to the first aspect of the present invention, the charging current status supplied to the secondary battery is detected to control the application status of the charging current to the secondary battery and the full charging of the secondary battery is assured without overcharging.

In the charger according to the second aspect of the present invention, the charged voltage to the secondary battery is detected, the supply time of the subsequent charging current is controlled when the charged voltage is the predetermined voltage, and the full charging of the secondary battery is assured without overcharging.

In the charger according to the third aspect of the present invention, the charged voltage to the secondary battery is detected, the charge completion time at which the secondary battery is in the full charge status is derived based on the detected charged voltage and the charge characteristic information of the secondary battery, the supply time of the subsequent charging current is controlled based on the derived charge completion time, and the full charging of the secondary battery is assured without overcharging.

In the charger according to the fourth aspect of the present invention, the charged voltage charged to the secondary battery is detected, the battery capacity for the detected charged voltage is displayed whether the charging current is supplied from the constant voltage/constant current regulation circuit or not, and the battery capacity of the secondary battery is manifested to the user.

In the charger according to the fifth aspect of the present invention, the charged voltage charged to the secondary battery is detected, the charge capacity for the detected charged voltage is displayed during the supply of the charging current from the constant voltage/constant current regulation circuit, and the charge capacity of the secondary battery is manifested to the user.

In the charger according to the sixth aspect of the present invention, the charge amount monitor means shortens the charge capacity display interval of the secondary battery after the charge capacity of the secondary battery has reached the predetermined capacity, and the approach to the full charging to the user is manifested.

DETAILED DESCRIPTION OF THE PREFERRED EMBODIMENTS

[First Embodiment]

Figure 1:
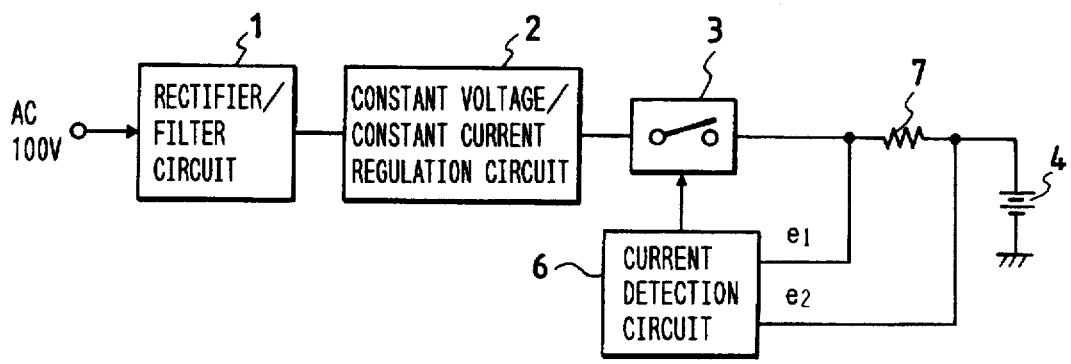
FIG. 1 shows a block diagram for illustrating a configuration of a charger in accordance with a first embodiment of the present invention.
Figure 2:
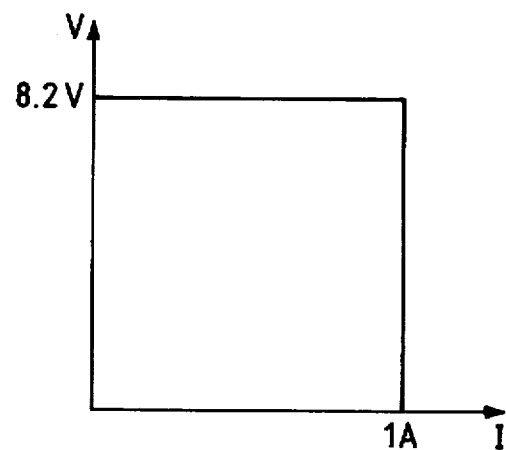
FIG. 2 illustrates an operation of a constant voltage/constant current regulation circuit shown in FIG. 1.
Figure 3:
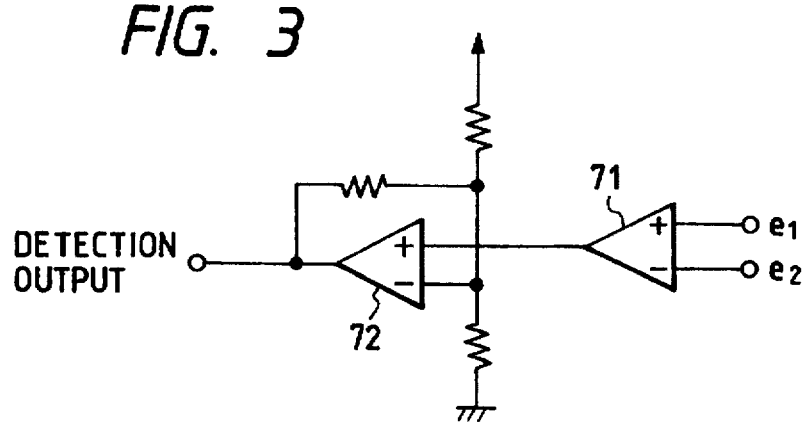
FIG. 3 shows a circuit block diagram for illustrating a detailed configuration of a current detection circuit shown in FIG. 1.
Figure 4:
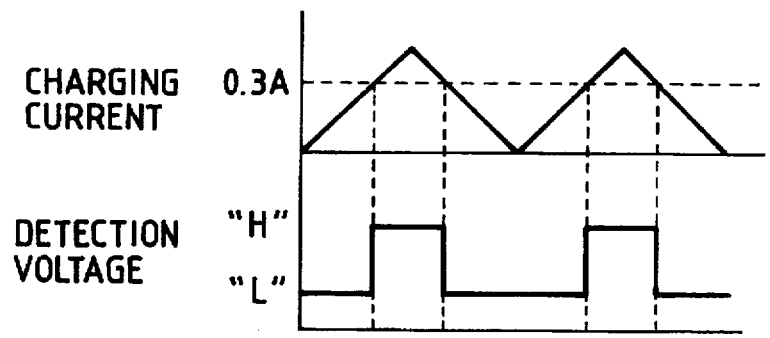
FIG. 4 illustrates an operation of the current detection circuit shown in FIG. 3.
Figure 13:
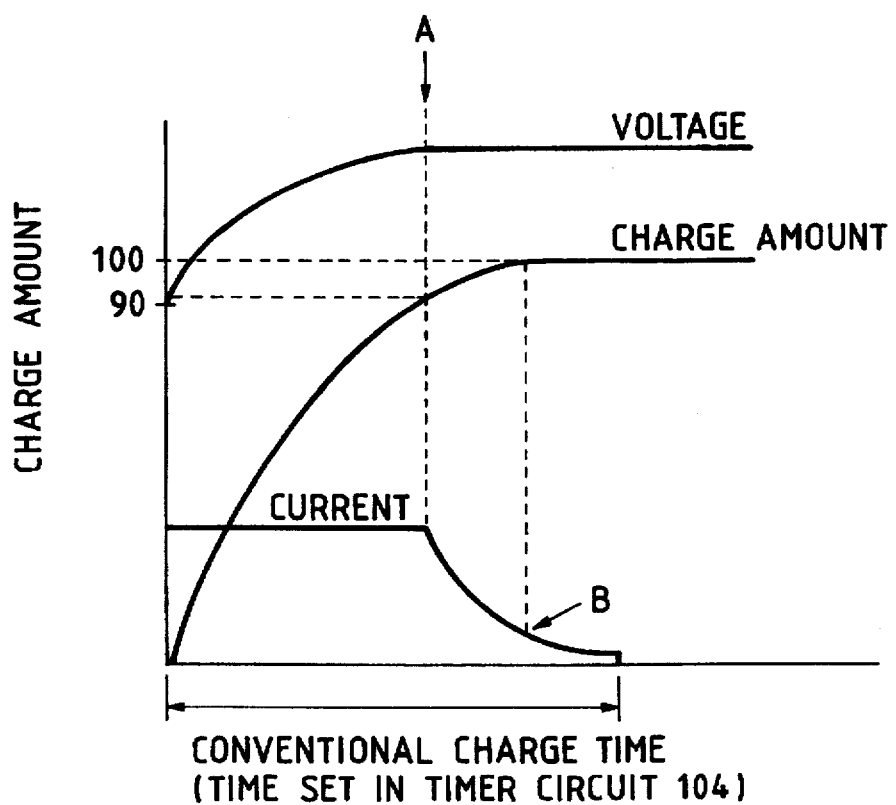
FIG. 13 shows a characteristic chart showing a time shift of a battery voltage and a charging current in charging by the prior art charger.

FIG. 1 shows a block diagram for illustrating a configuration of a charger in accordance with a first embodiment of the present invention. In FIG. 1, numeral 1 denotes a rectifier/filter circuit which converts an AC 100 volts voltage to a DC 8.5 volts voltage. Numeral 2 denotes a constant voltage/constant current regulation circuit which regulates an output of the rectifier/filter circuit 1 to a charging current which is no greater than a predetermined current (1 ampere in the present embodiment) and a charging voltage to a voltage which is no greater than a predetermined voltage (8.2 volts in the present embodiment) as shown in FIG. 2. Numeral 3 denotes a switching circuit (switch) which comprises transistors and starts the charging when a detection signal is 'L' and stops the charging when the detection signal is 'H'. Numeral 4 denotes a lithium ion battery (battery) which may be a series connection of two cells to provide a nominal voltage of 7.2 volts and a nominal capacity of 940 mAh. Numeral 6 denotes a current detection circuit and numeral 7 denotes a charging current detection resistor (resistor). The current detection circuit 6 converts a voltage e1, e2 across the charging current detection resistor 7 shown in FIG. 1 to a voltage by a differential amplifier 71 shown in FIG. 3 and the voltage is compared by a comparator 72 to produce an 'H' output when the charging current flowing through the charging current detection resistor (resistor) 7 is 0.3 ampere or higher, and produce an 'L' output when the charging current is lower than 0.3 ampere as shown in FIG. 4. It has been experimentarily proved that, in FIG. 4, the amount of charge when the charging current is 0.3 ampere (point B in FIG. 13) is substantially full charge. The correspondence of the present embodiment and the respective means of the first aspect of the present invention and the operations thereof are explained below.

In the first aspect of the present invention, the charging current status supplied to the secondary battery (battery 4) is detected by the current detection circuit 6 and the application of the charging current to the secondary battery is controlled by turning on and off the switch 3 in accordance with the output of the current detection circuit 6 to assure the full charging of the secondary battery without overcharging.

Figure 5:
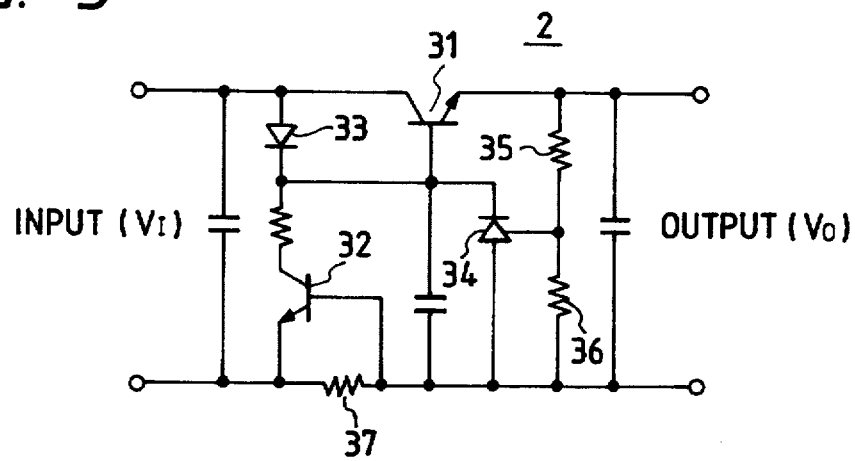
FIG. 5 shows a circuit diagram for illustrating a detailed configuration of the constant voltage/constant current regulation circuit shown in FIG. 1.

FIG. 5 shows a circuit diagram of the constant voltage/constant current regulation circuit 2 shown in FIG. 2.

In FIG. 5, numerals 31 and 32 denote transistors, numeral 33 denotes a constant current diode, numeral 34 denotes a shunt regulator, numerals 35 and 36 denote dividing resistors for generating a reference voltage for the shunt regulator 34, and numeral 37 denotes a resistor.

An operation of the constant voltage/constant current regulation circuit 2 is explained.

As the output Vo increases, the voltage divided by the dividing resistors 35 and 36 also increases and the reference voltage of the shunt regulator 34 increases so that a current Ik flowing into the shunt regulator 34 increases. Since the total of the currents flowing into the shunt regulator 34 and the transistors 31 and 32 is regulated constant by the constant current diode 33, a base current Ib of the transistor 31 decreases as the current Ik increases, and the output Vo decreases.

As the output Vo decreases, the opposite phenomenon to that described above takes place so that the constant voltage is maintained. As the load current connected to the output increases, the voltage drop across the resistor increases.

Thus, a base-emitter voltage Vbe of the transistor 32 increases and a collector current Ic increases. As the collector current Ic increases, the base current Ib of the transistor 31 decreases and the load current decreases. As the load current decreases, the opposite phenomenon to that described above takes place so that the constant current is maintained.

Figure 6:
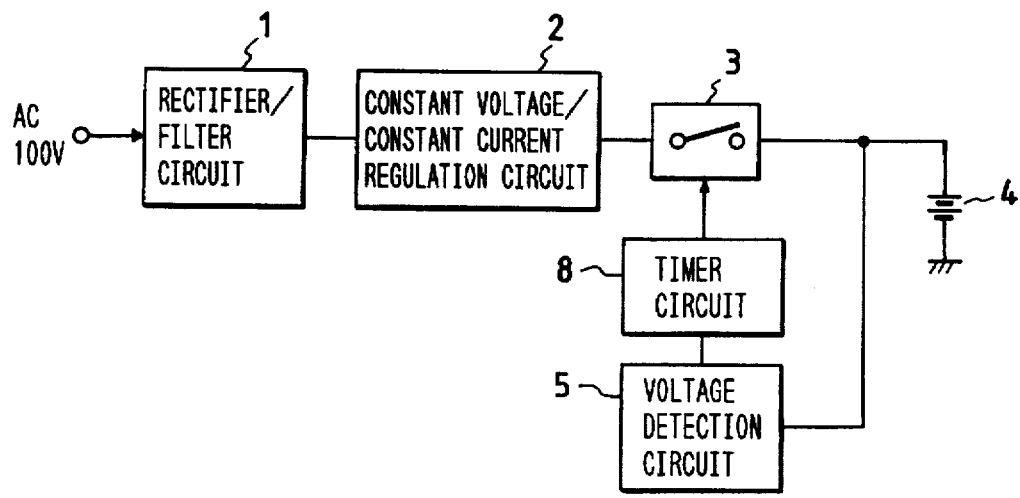
FIG. 6 shows a block diagram for illustrating a configuration of a current detection circuit in accordance with a second embodiment of the present invention.

In the first embodiment, the charging is controlled by the current detection circuit 6 for detecting the charging current to attain the rapid charging. As shown in FIG. 6, a timer circuit 8 may be added to the charger shown in FIG. 13 to further increase the amount of charge. The correspondence of the respective means of the present embodiment and the second aspect of the present invention as well as the operations thereof are explained below.

In the second aspect of the present invention, the charged voltage charged to the battery 4 is detected by the voltage detection circuit 5, and if the charged voltage is at the predetermined potential, the supply time of the subsequent charging current, which is set in the timer circuit 8, is controlled to assure the full charging of the secondary battery without overcharging.

[Second Embodiment]

FIG. 6 shows a block diagram for illustrating a configuration of a second embodiment of the present invention. The like elements to those shown in FIG. 1 are designated by the like numerals.

As shown in FIG. 6, the timer circuit 8 starts the timing of a predetermined time-out (five minutes in the present embodiment) based on the detection output of the voltage detection circuit 5, and after the elapse of the predetermined time period, it opens the switch 3 to stop the charging.

Thus, the present embodiment allows the substantially 100% charging while the charge amount at the point A in the prior art is approximately 90%.

[Third Embodiment]

Figure 7:
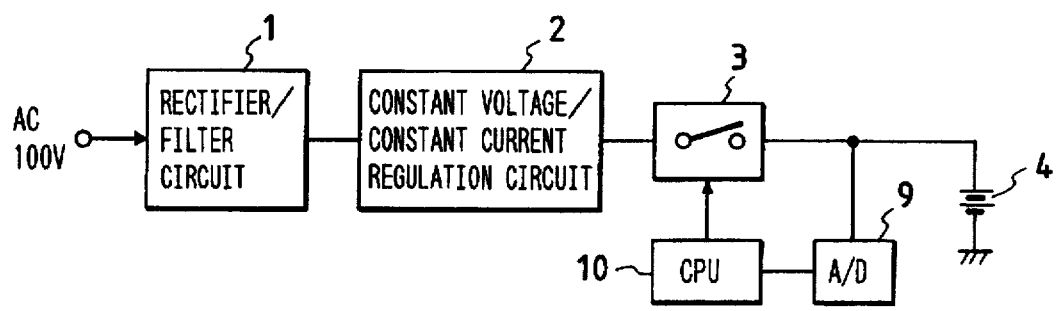
FIG. 7 shows a block diagram for illustrating a configuration of a charger in accordance with a third embodiment of the present invention.

In the first embodiment, the charging is controlled by the current detection circuit 6 which detects the charging current to attain the rapid charging. As shown in FIG. 7, it may be substituted by an A/D converter 9 for converting the battery voltage to digital data and a CPU 10.

FIG. 7 shows a block diagram for illustrating a configuration of a charger in accordance with the third embodiment of the present invention. The like elements to those shown in FIG. 1 are designated by the like numerals.

Figure 14:
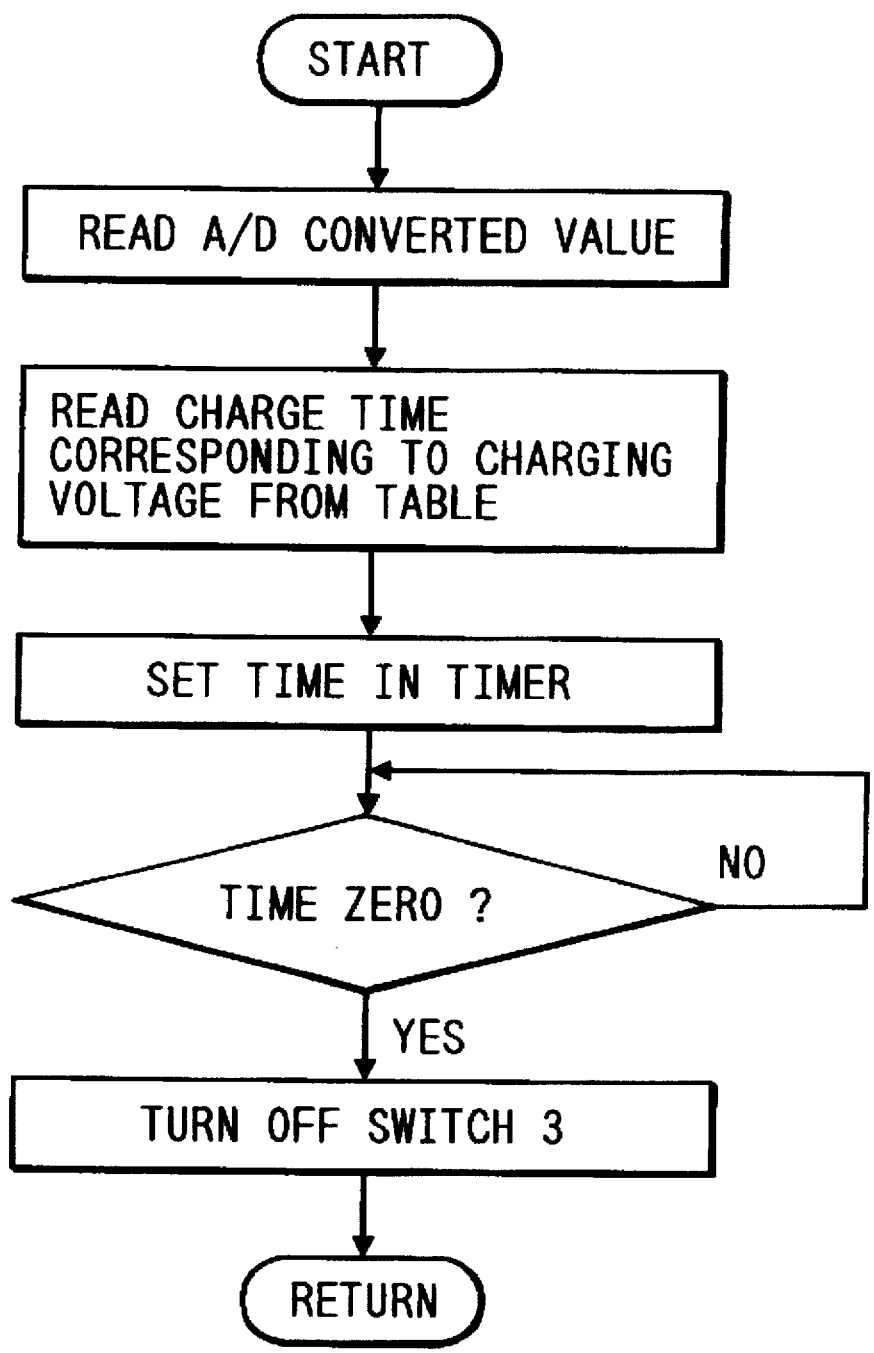
FIG. 14 shows a control procedure stored in a ROM shown in FIG. 7.

In FIG. 7, numeral 9 denotes an A/D converter which converts the battery voltage of 0 to 10 volts to an 8-bit digital value. Numeral 10 denotes a processor (CPU) having a ROM and RAM for storing a control procedure shown in FIG. 14, and calculates a remaining amount of battery charge from characteristic data shown in FIG. 8 and stored in the ROM as charging characteristic information based on the battery voltage in accordance with the control procedure stored in the ROM and determines a charging time necessary for the full charging. The correspondence of the respective means of the present embodiment and the third aspect of the present invention as well as the operations thereof are explained below.

In the third aspect of the present invention, the CPU 10 detects the A/D converted charged voltage charged to the battery 4 in accordance with the control procedure stored in the ROM, derives the charge completion time at which the battery 4 is in the full charge state based on the detected charged voltage and the charging characteristic information of the secondary battery 4 and controls the supply time of the subsequent charging current based on the derived charge completion time, by an internal timer process to assure the full charging of the secondary battery without overcharging.

For example, when the battery voltage is 8.2 volts, the charging is not required because it is in the full charge state so that the charging time is zero. When the battery voltage is 5.0 volts, the remaining capacity of the battery is 0% and the charging time is 60 minutes. When the battery voltage is 6.5 volts, the charging time is 33 minutes.

The CPU 10 times the calculated required charging time by the internal timer or a timer circuit, not shown, and when the time is elapsed, it outputs a detection signal to open the switch 3 to stop the charging.

Figure 8:
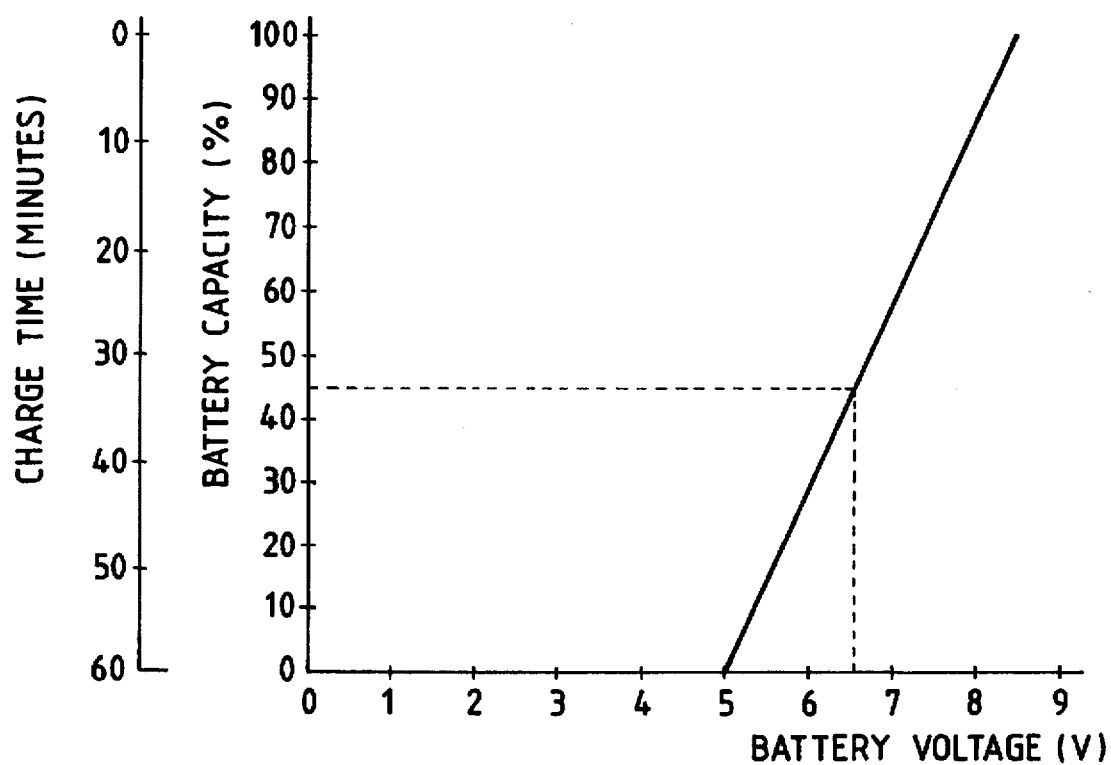
FIG. 8 shows a characteristic chart of a battery voltage and a battery remaining capacity and a charging time of the battery shown in FIG. 7.

FIG. 8 shows a characteristic chart of a relation between the battery voltage of the battery 4 shown in FIG. 7 and the remaining capacity of the battery and the charging time, in which an ordinate represents the battery capacity (in %) and the charging time (in minutes) and an abscissa represents the battery voltage (in volts).

[Fourth Embodiment]

Figure 9:
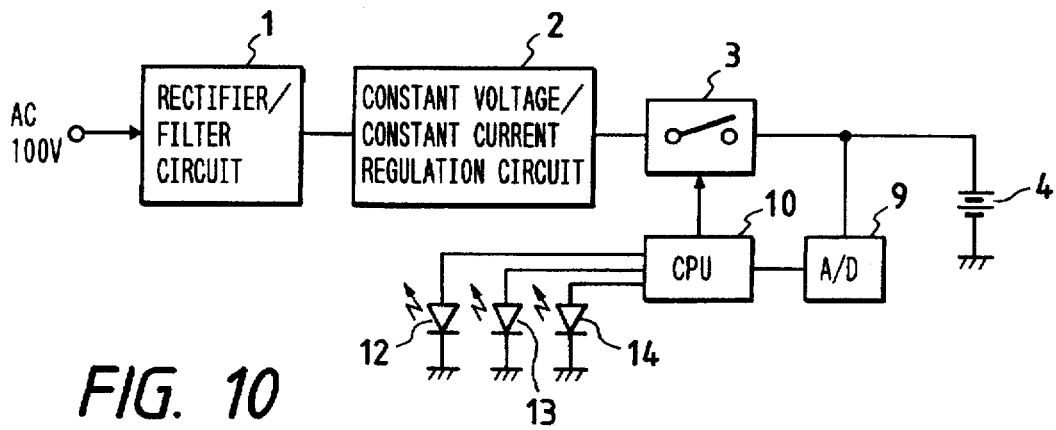
FIG. 9 shows a block diagram for illustrating a configuration of a charger in accordance with a fourth embodiment of the present invention.
Figure 10:
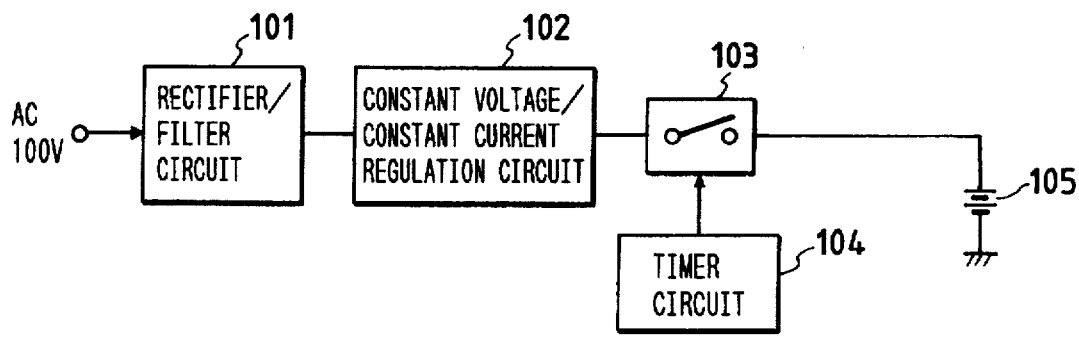
FIG. 10 shows a circuit block diagram for illustrating a configuration of a prior art charger.
Figure 11:
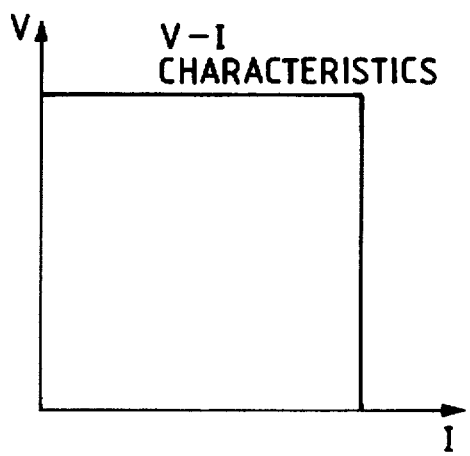
FIG. 11 shows a characteristic chart of a voltage-current characteristic of a constant voltage/constant current regulation circuit shown in FIG. 10.
Figure 12:
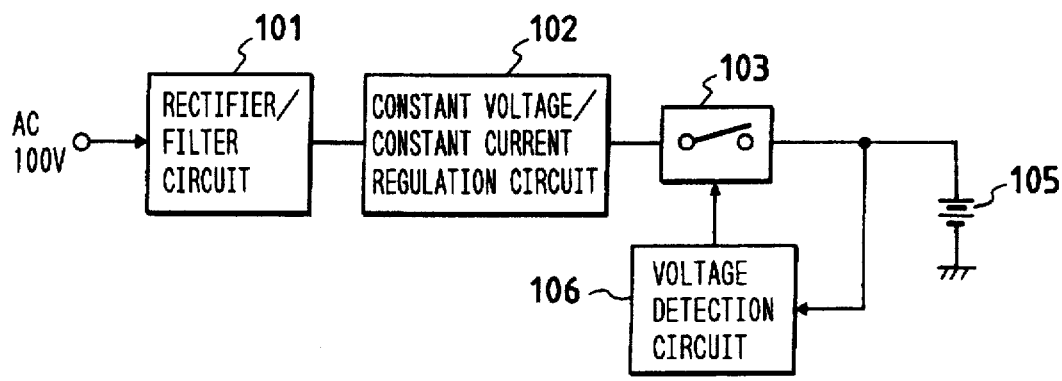
FIG. 12 shows a circuit block diagram for illustrating a configuration of another prior art charger.

In the third embodiment, the remaining capacity of the battery is detected in accordance with the battery voltage and the charging time is determined in accordance therewith. As shown in FIG. 9, LED's 12, 13 and 14 which are fired by a command from the CPU 10 may be added to display the charge status.

FIG. 9 shows a block diagram for illustrating a configuration of a charger in accordance with a fourth embodiment of the present invention. The like elements to those shown in FIG. 1 are designated by the like numerals.

Figure 15:
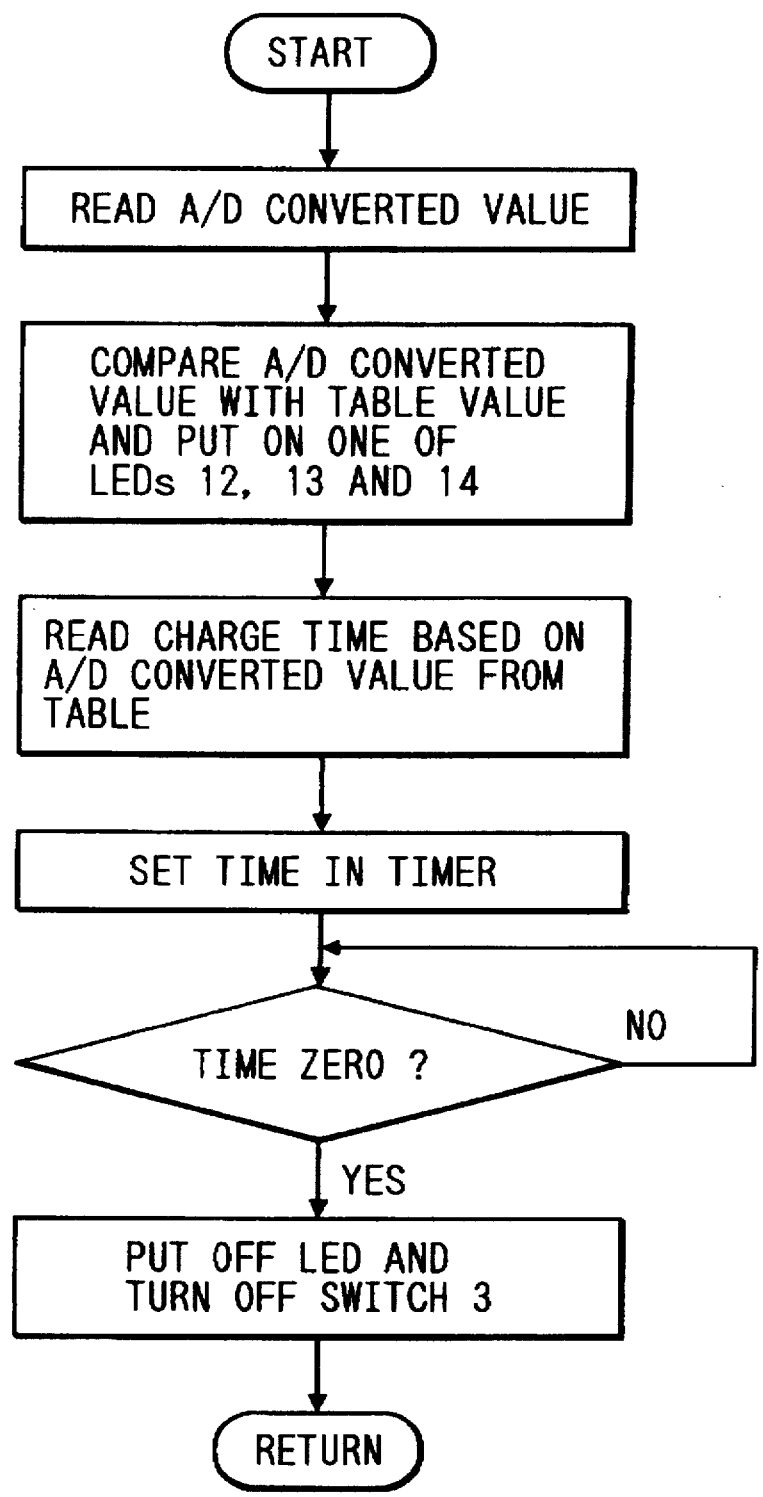
FIG. 15 shows a control procedure stored in a ROM shown in FIG. 9.

In FIG. 9, numerals 12 to 14 denote LED's when the battery voltage is no higher than 6.0 volts as shown in FIG. 8 (that is, no higher than 31% of the full charge of the battery capacity), the CPU 10 fires the LED 12 in accordance with the control procedure stored in the ROM as shown in FIG. 15, when the battery voltage is between 6.1 volts and 7.1 volts (that is, between 32% and 64% of the full charging of the battery capacity), it fires the LED's 12 and 13, and when the battery voltage is no lower than 7.2 volts (that is, no lower than 65% of the full charging of the battery capacity), it fires the LED's 12, 13 and 14 to manifest the battery capacity (charge amount) to the user.

Figure 16:
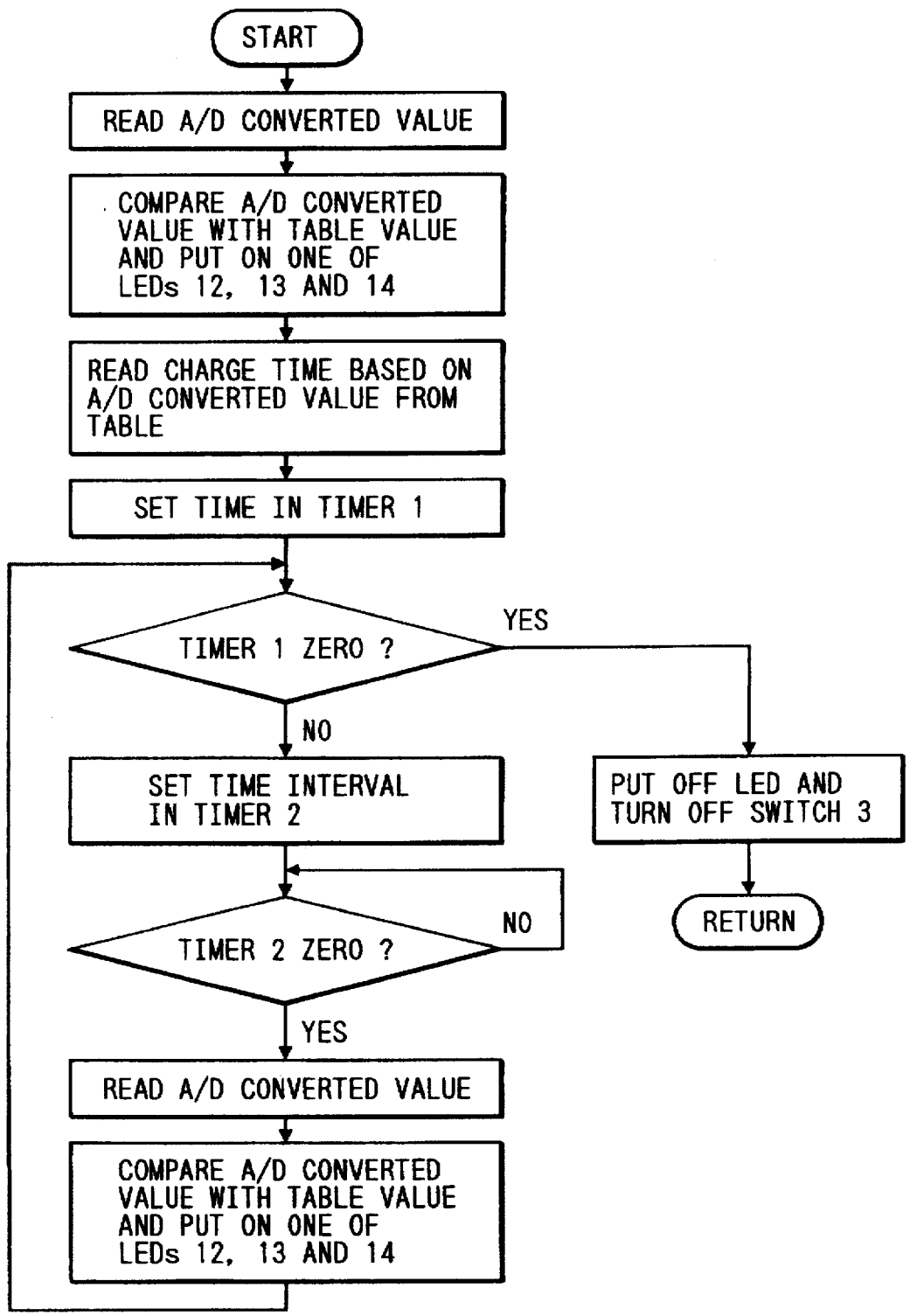
FIG. 16 shows a control procedure stored in the ROM shown in FIG. 9

During the charging, the battery voltage may be measured at a constant time interval by storing a control procedure shown in FIG. 16 in the ROM of the CPU 10 and it may be displayed by the LED's in the manner described above so that the progress of charge may be manifested to the user.

The correspondence of the respective means of the present embodiment and the fourth to sixth aspects of the present invention as well as the operations thereof are explained below.

In the fourth embodiment, the CPU 10 detects the A/D converted charged voltage charged to the battery 4 and displays the battery capacity in accordance with the detected charged voltage by the LED's 12 to 14 whether the charging current is supplied from the constant voltage/constant current regulation circuit 2 or not to manifest the battery capacity of the secondary battery to the user.

In the fifth aspect of the present invention, the CPU 10 as the charge amount monitoring means detects the charged voltage charged to the battery 4 and displays the charging capacity in accordance with the detected charged voltage by the LED's 12 to 14 during the supply of the charging current from the constant voltage/constant current regulation circuit 2 to manifest the charge capacity of the battery 4 to the user.

In the sixth aspect of the present invention, the CPU 10 as the charge amount monitoring means shortens the battery capacity display interval of the battery 4 (by shortening an interrupt timing) when the battery capacity of the battery 4 exceeds the predetermined capacity to manifest the approach to the full charging to the user.

In accordance with the first aspect of the present invention, since the charging current status supplied to the secondary battery is detected to control the application status of the charging current to the secondary battery, the full charging of the secondary battery is assured without overcharging.

In accordance with the second aspect of the present invention, since the charged voltage charged to the secondary battery is detected and the supply time of the subsequent charging current is controlled when the charged voltage is the predetermined voltage, the full charging of the secondary battery is assured without overcharging.

In accordance with the third aspect of the present invention, since the charged voltage charged to the secondary battery is detected, the charge completion time at which the secondary battery is in the full charge status is derived based on the detected charged voltage and the charge characteristic information of the secondary battery and the supply time of the subsequent charging current is controlled based on the derived charge completion time, the full charging of the secondary battery is assured without overcharging.

In accordance with the fourth aspect of the present invention, since the charged voltage charged to the secondary battery is detected and the battery capacity for the detected charged voltage is displayed whether the charging current is supplied from the constant voltage/constant current regulation circuit or not, the battery capacity of the secondary battery is manifested to the user.

In accordance with the fifth aspect of the present invention, since the charged voltage charged to the secondary battery is detected and the charge capacity for the detected charged voltage is displayed during the supply of the charging current from the constant voltage/constant current regulation circuit, the charge capacity of the secondary battery is manifested to the user.

In accordance with the sixth aspect of the present invention, since the charge amount monitoring means shortens the charge capacity display interval of the secondary battery after the charge capacity of the secondary battery has reached the predetermined capacity, the approach to the full charging to the user is manifested.

What is claimed is:

1. A charger for supplying a charging current from a constant voltage/constant current regulation circuit to a secondary battery to charge the battery to a predetermined potential, comprising:

voltage detection means for detecting whether the charged voltage of the secondary battery is at the predetermined potential or not;

derive means for deriving a charge completion time required to render the secondary battery to a full charge state in accordance with the output of said voltage detection means and charge characteristic information of the secondary battery; and control means for controlling a supply time of the charging current supplied from said constant voltage/ constant current regulation circuit based on the charge completion time derived by said derive means.

2. A charger according to claim 1 wherein said derive means includes a memory for storing a table containing charge time associated with the charged voltages.

3. A charger according to claim 1 wherein said control means includes switching means for shutting off the charging current to said secondary battery.

4. A charger according to claim 1, wherein the secondary battery has a lithium based material in a positive electrode.

5. A charger for supplying a charging current from a constant voltage/constant current regulation circuit to a secondary battery to charge the battery to a predetermined potential, comprising:

a plurality of display means for displaying a battery capacity of the secondary battery;

voltage state detection means for detecting a charged voltage state of the secondary battery; and charge amount monitoring means for causing said display means to display the battery capacity of the secondary battery in accordance with the output of said voltage state detection means at a predetermined interval during the supply of the charging current from said constant voltage/constant current regulation circuit, said charge amount monitoring means shortening the battery capacity display interval after the battery capacity of the secondary battery exceeds a predetermined capacity.

6. A charger according to claim 5 wherein said display means comprises light emitting diodes.

7. A charger according to claim 5 wherein the secondary battery has a lithium based material in a positive electrode.

8. A method for supplying a charging current from a constant voltage/constant current regulation circuit to a secondary battery to charge the battery to a predetermined potential, comprising the steps of:

detecting whether the charged voltage of the secondary battery is at the predetermined potential or not;

deriving a charge completion time required to render the secondary battery to a full charge state in accordance with the output of said detecting step and charge characteristic information of the secondary battery; and controlling a supply time of the charging current supplied from the constant voltage/constant current regulation circuit based on the charge completion time derived by said deriving step.

9. A method according to claim 8, wherein the deriving step is performed using a memory which stores a table containing charge time associated with the charged voltages.

10. A method according to claim 8, wherein the controlling step further includes a switching step for shutting off the charge current to the secondary battery.

11. A method according to claim 8, wherein the secondary battery has a lithium based material in a positive electrode.

12. A method for supplying a charging current from a constant voltage/constant current regulation circuit to a secondary battery to charge the battery to a predetermined potential, comprising the steps of:

displaying a battery capacity of the secondary battery;

detecting a charged voltage state of the secondary battery; and causing the display means to display the battery capacity of the secondary battery in accordance with the output of said detecting step at a predetermined interval during the supply of the charging current from the constant voltage/constant current regulation circuit, said causing step shortening the battery capacity display interval after the battery capacity of the secondary battery exceeds a predetermined capacity.

13. A method according to claim 12, wherein the displaying step is performed using light emitting diodes.

14. A method according to claim 12, wherein the secondary battery has a lithium based material in a positive electrode.

* * * * *